United States Patent [19]

Hamann et al.

[11] 3,862,924

[45] Jan. 28, 1975

[54] SUSPENSION POLYMERIZATION IN BRINE OF UNIFORM SPHERICAL POLYMER BEADS

[75] Inventors: Herman C. Hamann, Melrose Park; William Stellwagen, Jr., Trevose, both of Pa.

[73] Assignee: Rohm and Haas Company, Philadelphia, Pa.

[22] Filed: Nov. 7, 1973

[21] Appl. No.: 413,487

[52] U.S. Cl....... 260/88.1 PA, 260/17 A, 260/17 R, 260/2.1 E, 260/67 A, 260/88.1 PN, 260/92.8 W

[51] Int. Cl......... C08f 3/22, C08f 7/14, C08f 29/10

[58] Field of Search............ 260/17 A, 17 R, 2.1 E, 260/88.1 PA, 88.1 PN, 92.8 W, 67 A

[56] References Cited
UNITED STATES PATENTS

| | | |
|---|---|---|
| 2,809,945 | 10/1957 | Wright et al.......................... 260/17 |
| 2,892,802 | 6/1959 | Budewitz ............................. 260/17 |
| 3,051,668 | 8/1962 | Bauer................................... 260/17 |
| 3,553,180 | 1/1971 | Cleary................................. 260/88.1 |
| 3,565,872 | 2/1971 | Katchalski et al. ................. 260/88.1 |
| 3,689,439 | 9/1972 | Field et al........................... 260/88.1 |
| 3,701,742 | 10/1972 | Richardson et al................ 260/92.8 |
| 3,716,507 | 2/1973 | Glomski et al....................... 260/17 |
| 3,719,651 | 3/1973 | Greminger........................ 260/92.8 |
| 3,757,001 | 9/1973 | Reiter et al........................ 260/92.8 |
| 3,801,519 | 4/1974 | Brodof................................. 260/17 |

Primary Examiner—Melvin Goldstein
Assistant Examiner—Edward Woodberry
Attorney, Agent, or Firm—H. Jolyon Lammers

[57] ABSTRACT

Uniform polymer beads or particles are produced by a suspension polymerization technique with the aid of a dispersion system comprising a combination of a high molecular weight polysaccharide and a hydroxy alkyl methyl cellulose.

2 Claims, No Drawings

SUSPENSION POLYMERIZATION IN BRINE OF UNIFORM SPHERICAL POLYMER BEADS

This invention concerns a suspension polymerization process carried out under such conditions as to produce polymer beads of great uniformity. More particularly, the invention relates to a suspension polymerization process of water soluble monomers in brine carried out in the presence of a dispersion system comprising a combination of a high molecular weight linear polysaccharide and a hydroxy-alkyl methyl cellulose.

It has long been found desirable to polymerize water soluble monomer in a medium having a high salt content, for the purpose of limiting the solubility of the monomer in the aqueous phase. Unfortunately, the use of a salt medium adversely affects the ability of many of the commonly available dispersants to perform satisfactorily. Additionally, surface and interfacial tension properties of the aqueous solution are also adversely affected by the salt solutions causing an increase in surface and interfacial tension.

One known and commercially available dispersant which has found great utility in non-brine polymerization processes is Xanthan gum. Xanthan gums are commercially available from Kelco Company under the trademark Kelzan and may have the following general formula.

Since such dispersants used alone in suspension polymerizations in brine were found to be unsuitable, it was surprising to discover that upon addition of a small amount of suitable surface tension modifier, dispersions of good uniformity and satisfactory bead size could be prepared.

Suitable surface and interfacial tension modifiers include cellulose gums which also are commercially available. Cellulose gums are derived from and have a polymeric backbone of cellulose, a natural carbohydrate that contains a basic repeating structure of anhydroglucose units. Cellulose gums are available from the Dow Chemical Company under the trademark Methocel and may have the following general formula.

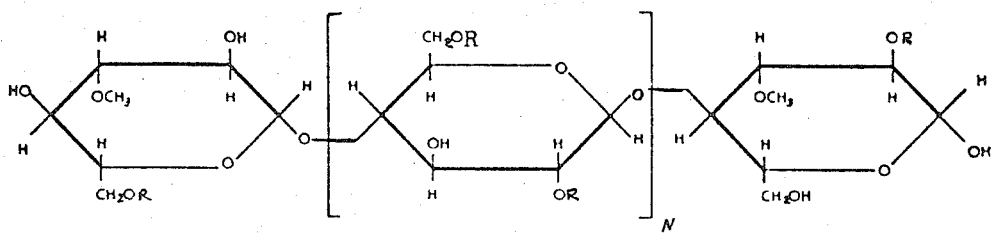

where

R = an alkyl or hydroxyalkyl residue usually methyl, ethyl, hydroxyethyl, hydroxypropyl, or hydroxybutyl or a mixture of these groups;

where N is any whole number within the range of about 50 to about 900

It should be noted that the dispersion system composed of a high molecular weight polysaccharide and a hydroxyalkyl methyl cellulose accomplishes the specific objective of the invention, which objective cannot be accomplished by either of these components alone.

According to the invention there is provided the suspension polymerization of one or more water soluble monomers suspended in an aqueous medium having a high salt content, wherein the improvement comprises preparing uniformly sized and spherical beads by carrying out the polymerization in the presence of a dispersion system comprising:

1. a polysaccharide dispersant, and
2. a hydroxyalkylmethyl cellulose surface and interfacial tension modifier.

The monomers which are used in the present inven-

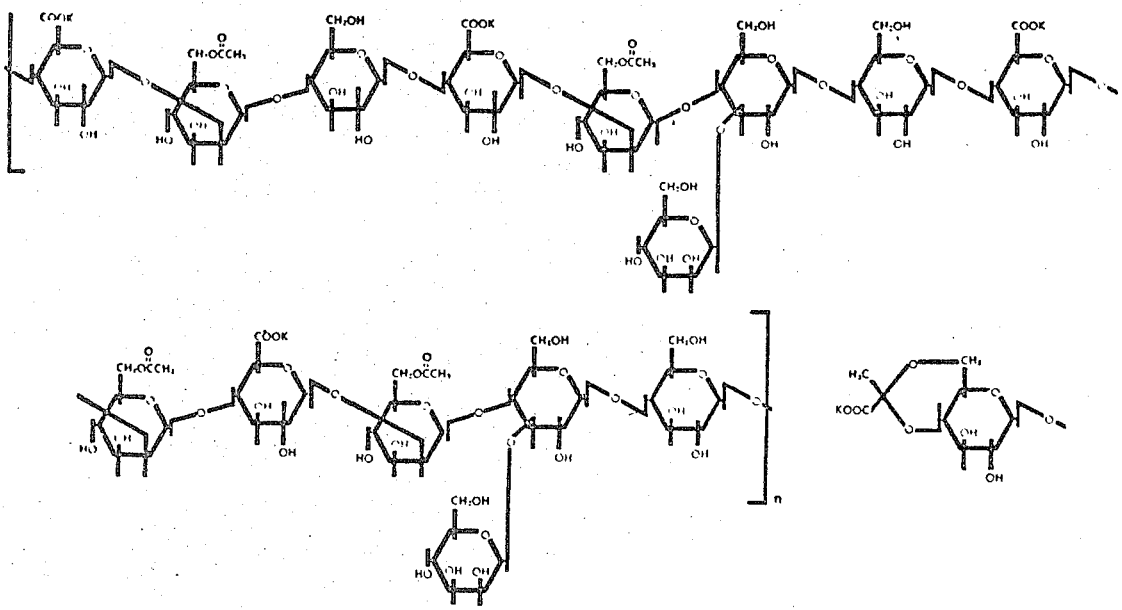

tion to produce the uniformly sized and uniformly spherical bead polymers or copolymers are generally substantially water soluble.

The preferred monomers are those that are useful in the manufacture of ion exchange resins, either directly, or as backbones for conversion to ion exchange resins. When the monomers are polymerized to produce ion exchange resins, the resins may be produced in the gel form or in the macroreticular porous form. The monomers may be monoethylenically or polyethylenically unsaturated and, thus, they will contain at least one group of the formula

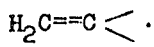

Examples of such monomers include vinyl esters of ($C_1$–$C_{18}$) aliphatic acids such as vinyl acetate, a vinyl acetate, a vinyl aromatic hydrocarbon such as, for example, styrene, vinyl toluene, isopropenyl toluene, and divinyl benzene, acrylonitrile, methacrylonitrile, ethacrylonitrile and phenylacrylonitrile; acrylamide, methacrylamide, ethacrylamide N-methylol acrylamide, N-monoalkyl and N,N-dialkyl acrylamides and methacrylamides, e.g., N-monoethyl, -ethyl, -propyl, -butyl, and N-dimethyl, -ethyl, -propyl, -butyl, etc. alkacrylamides, e.g., N-monophenyl and N,N-diphenyl acrylamides and methacrylamides; vinyl ethers, such as butyl vinyl ethers; N-vinyllactams such as N-vinylpyrrolidone; itaconic diesters containing a single $CH_2$=C grouping, e.g., dimethyl, diethyl, dipropyl, dibutyl and other saturated aliphatic monohydric alcohol diesters of itaconic acid, diphenyl itaconate, di-(phenylethyl) itaconate; allyl and methallyl esters of saturated aliphatic monocarboxylic acid, e.g., allyl and methallyl propionates, allyl and methallyl valearates; vinyl thiophenes; various N-vinyl heterocyclics such as the 2-vinyl and 4-vinyl pyridines and alkylated vinyl pyridines, etc.

The concentrations of the dispersant and surface and interfacial modifier can be varied over a reasonable range but generally the effective concentration range for the dispersant is from about 0.05% to about 0.5% by weight of the water and for the modifier from about 0.007% to about 0.02%.

Surprisingly the dispersant and modifier combination can be used to produce uniformly sized and uniformly spherical polymer beads of both the gel type and macroreticular or phase extended type. (The term "macroreticular" is well defined and described in the prior art, for example, see British Pat. No. 935,125 and the text entitled *Oxidation-Reduction Polymers* by Cassidy and Kun, 1956, Interscience Publications, New York, N.Y.)

In producing the uniformly sized and uniformly spherical polymers, copolymers and/or crosslinked interpolymers, the monomer mixtures are subjected to suspension polymerization in the presence of a suitable catalyst. The catalysts which form the free radicals necessary for the polymerization are conventional and are usually of the organic peroxide type. Typical examples include benzoyl peroxide, lauroylperoxide, t-butylperbenzoate, quinonehydroperoxide, azo-bisisobutyronitrile, and the like. The polymerization is preferably carried out using a free radical catalyst; however, radiation induced polymerization can also be employed using such high energy radiation as X-rays or gamma-rays.

Polymerization times, temperatures and pressures may vary considerably in accordance with techniques known to the art and depending on the monomer system used, type and concentration of catalyst. Polymerization may require from as little as a few minutes to several hours, suitable temperatures range from less than about 0°C. to more than 200°C., pressures from less than one atmosphere to several atmospheres. In a representative embodiment using a mixture of a water dispersible vinyl aromatic monomer such as styrene and polyfunctional crosslinking agent such as divinylbenzene, the polymerization is effective by heating the mixture to a temperature in the range from about 60°–90°C., in the presence of about one weight percent lauroylperoxide for about 10 hours.

The polymerization reactions are preferably carried out in the absence of polyvalent metal ions so as to avoid unwanted side reactions with the metal ions. The preferred pH range is from 1.5 to 12 since it has been found that Xanthan gum may degrade and precipitate at a pH above this range. Additionally, a high pH during the polymerization reaction encourages polyvalent metal ions to undergo precipitation reactions. Fewer interferences of this type are experienced when the polymerization reaction is carried out at a pH in the medium range. Care should be taken to prevent the pH of the reaction from dropping below 1.5 since insoluble Xanthan gum particles may form in particularly acid environment.

The following examples are illustrative of the present invention. Throughout the specification all parts and percentages are by weight, and temperatures are in °C., unless otherwise stated.

EXAMPLE I

To a 3 liter round bottom flask equipped with a stirrer, thermometer and reflux condenser was charged 200 g. of a 0.2% by weight solution of Xanthan gum, 40 g. of a 0.16%, by weight, solution of hydroxypropyl methyl cellulose, 600 g. of tap water and 340 g. of sodium chloride (salt). The reactor was stirred until solution of the salt was complete. To this brine was added, without stirring, a solution of 224 g. of 4-vinylpyridine, 136 g. of a commercial grade of divinylbenzene, 240 g. of diisobutylketone and 3.6 g. of azobisisobutyronitrile. Stirring was commenced and there was an immediate formation of a suitable dispersion. The reaction is heated to 65° C. and held for 10 hours. The reaction is then further heated to remove diisobutylketone by azeotropic distillation. The reaction slurry is washed and dried to yield 353 g. (98% of monomers) of product which has an effective size (E.S.) of 0.474; harmonic mean size (H.M.S.) of 0.639 and a uniformity coefficient (U.C.) of 1.543.

EXAMPLE II

Following the procedure of Example I, a 2 liter cylindrical resin kettle was charged 157 g. of a 0.2% Xanthan gum solution, 267 g. of salt, 31 g. of a 0.16% hydroxyalkylmethyl cellulose solution and 472 g. of water. After the solution of the salt was completed, a solution of 223.6 g. of 4-vinylpyridine, 136.4 g. of divinylbenzene, 240 g. of diisobutylketone and 3.6 of azobisisobutyronitrile was charged. A suitable dispersion forms immediately upon stirring. The resultant product has an Effective Size (E.S.) of 0.537, a harmonic mean size (H.M.S.) of 0.634 and uniformity coefficient (U.C.) of 1.342.

EXAMPLE III

Following the procedure of Example I, to a 1 liter round bottom flask containing an aqueous solution comprising 0.16 g. Xanthan gum, 0.0025 g. hydroxybutyl methyl cellulose, 134 g. of salt and 330 g. of water is charged a solution of 269.7 g. acrolein, 30.3 g. divinylbenzene and 9 grams of peroxydicarbonate catalyst. Stirring forms an immediate suspension and the reaction is heated to 50°C. under a flow of nitrogen. After continued heating overnight the slurry is cooled, washed and dried to yield 276 g. of beads having an Effective Size (E.S.) of 0.410, a harmonic mean size (H.M.S.) of 0.571 and a uniformity coefficient of 1.683.

EXAMPLE IV

Following the procedure of Example I there is charged to a 1 liter round bottom flask with the same aqueous phase as in Example III a solution of 157.3 g. vinylbenzyldimethylamine, 22.8 g. divinylbenzene, 120 g. of iso-octane and 1.8 g. azobisisobutyronitrile. A suitable dispersion forms immediately upon stirring. The reaction is heated to 70°C. and held at that temperature for about 60 hours. This iso-octane is removed by azeotropic distillation and the salt is removed by washing the resin with copious amounts of water. The finished resin has a solids percentage of 59% and an anion exchange capacity of 5.44 meq/g. dry resin.

We claim:

1. In the suspension polymerization of one or more water soluble ethylenically unsaturated monomers suspended in an aqueous medium having a high salt content, the improvement comprises preparing uniformly sized and spherical beads by carrying out the polymerization in the presence of a dispersion system comprising:
   1. from about 0.05% to 0.5% by weight of water present of a high molecular weight Xanthan gum dispersant and
   2. from about 0.007% to 0.02% of a hydroxy($C_1$-$C_4$)alkylmethyl cellulose surface and interfacial modifier.

2. Process according to claim 1 wherein the surface and interfacial modifier is hydroxy propyl methyl cellulose.

* * * * *